3,284,549
NUCLEAR REACTOR FUEL ELEMENTS
Lionel Houston Ford, St. Anne's-on-the-Sea, Bryan Edward Ingleby, Lea Town, Preston, and Neil Silva Hibbert, Fulwood, Preston, England, assignors to United Kingdom Atomic Energy Authority, London, England
No Drawing. Filed Dec. 11, 1964, Ser. No. 417,825
Claims priority, application Great Britain, Dec. 31, 1963, 51,258/63; Mar. 19, 1964, 11,780/64
4 Claims. (Cl. 264—.5)

This invention relates to nuclear reactor fuel elements, and in particular to that kind of nuclear reactor fuel element which comprises shaped bodies of refractory material each having dispersed therein a plurality of spheroids of uranium carbide coated with a fission product retaining envelope, such as silicon carbide or pyrolytically deposited carbon.

When uranium monocarbide spheroids of greater than 50% theoretical density are coated with silicon carbide or pyrolytically deposited carbon, it is advantageous to keep the thickness of coating as thin as can be reconciled with integrity against release of fission products so that the fuel/matrix volume ratio can be kept sufficiently high to avoid the necessity for undue enrichment of the uranium. Due to the difference between the thermal expansion coefficients of uranium carbide and silicon carbide or pyrolytic carbon at reactor operating temperatures (that of uranium carbide being much greater), it would normally be necessary, in order to achieve a coating of the required integrity (since the release of fission products from the uranium monocarbide would be considerable), to provide coatings of such thickness that the said volume ratio would be so low as to require a degree of enrichment which may be unacceptable on economic grounds.

It is an object of the present invention to provide a method of producing coated spheroids of uranium carbide in which the thickness of coating can be kept to a minimum whilst retaining sufficient integrity for satisfactory operation in a nuclear reactor when the coated spheroids are dispersed in shaped bodies employed as fuel material in fuel elements.

According to the invention a method of producing high inegrity spherods of uranium carbide, having an outer coating of fission product retaining refractory material, comprises the steps of applying an initial thin coating of pyrolytic carbon to spheroids of uranium monocarbide at a deposition temperature in the range 1200° C. to 1400° C., such that reaction between the applied coating of pyrolytic carbon and the uranium monocarbide spheroids does not take place, followed by application of an outer coating of fission product retaining refractory material on the pyrolytic carbon coated uranium monocarbide spheroids at a temperature above 1500° C. such that reaction takes place between the initial pyrolytic carbon coating and the uranium monocarbide spheroids whereby uranium dicarbide is formed in the uranium monocarbide spheroids and, due to the reaction of the initial pyrolytic carbon coatings with the uranium monocarbide spheroids voidage in the form of a gap is produced between the spheroids and the outer coating of fission product retaining refractory material.

In a particular method in accordance with the invention the initial coating of pyrolytic carbon is applied to the uranium monocarbide spheroids at a deposition temperature in the range 1200° C. to 1400° C. and an outer coating of fission product retaining refractory material in the form of a coating of pyrolytic carbon is applied at a higher deposition temperature in the range 1500° C. to 1800° C.

In the above case it has been found that coatings of pyrolytic carbon 50–150 microns thick on spheroids originally for example 400–500 microns in diameter, possess high integrity provided that voidage is produced by carrying out the method.

In another method in accordance with the invention the initial coating of pyrolytic carbon is applied to the uranium monocarbide spheroids at a temperature in the range 1200° C. to 1400° C., an intermediate coating of silicon carbide is then applied at a temperature similar to that at which the initial pyrolytic carbon coating was applied and finally an outer coating of silicon carbide is applied at a higher temperature in the range 1500° C.–1600° C.

In the latter case it is found that coatings of silicon carbide of 30–100 microns thick on spheroids originally for example 400–500 microns diameter, possess high integrity that voidage is produced by carrying out the said method. It is at present thought that 1600° C. for the final coating temperature is a suitable upper limit because if higher temperatures are employed, porosity of the silicon carbide coating appears to result. However, once the coating has been applied, temperatures of the order of 1750° C. (which it may be necessary to employ for a subsequent step, concerning densifying of the shaped body in which the coated kernels are dispersed, in an overall process) have been found not significantly to affect the integrity of the coating, failure rates of less than 1 in $10^4$ having been experienced.

One method in accordance with the invention as applied to the production of uranium carbide spheroids having a coating of pyrolytically deposited carbon will now be described by way of example.

Uranium monocarbide spheroids are prepared by the method disclosed in our co-pending British patent application No. 9,538/63, cognate with British patent application No. 12,368/63 which was divided out of British patent application No. 14,475/62. The method disclosed comprises the steps of forming spheroids of a mixture of uranium dioxide, carbon and a binder and reaction sintering the spheroids so formed so as to produce spheroids or uranium carbide. In the present case the relative amounts of uranium dioxide and carbon used are such as to produce spheroids of uranium monocarbide.

The spheroids thus produced are graded by sieving to separate those of a size between for example 400 and 500 microns in diameter. Coating of the uranium monocarbide spheroids with pyrolytic carbon is now carried out in a fluidised bed reactor such as is also described in the above mentioned copending British patent application No. 9,538/63 cognate with divisional No. 12,368/63. A bed of the spheroids is maintained in a fluidised condition in the reactor using high purity argon as the gas for fluidisation. A hydrocarbon gas such as methane is used for deposition of the pyrolytic carbon coatings. The methane is mixed with the argon fluidising gas stream.

An initial coating of pyrolytic carbon is deposited on the uranium monocarbide spheroids at a deposition temperature in the range 1200° C. to 1400°. The initial coating of pyrolytic carbon is thin e.g. from 5–20 microns in thickness. As outer coating of pyrolytic carbon 50–150 microns in thickness is now deposited on the spheroids at a deposition temperature in the range 1500° C. to 1800° C.

It is implicit that when coating the uranium monocarbide spheroids with the outer coating of pyrolitic carbon at the higher deposition temperatures, the initial coating of pyrolytic carbon will react with the uranium monocarbide spheroids to form a higher carbide, generally the dicarbide. Reaction of the initial pyrolytic carbon coating with the uranium monocarbide spheroids during deposition of the outer coating of pyrolytic caron results in the formation of a gap between the uranium monocarbide spheroids and the outer pyrolytic carbon coating. In the case of uranium monocarbide spheroids of 400–500 microns diameter having an initial pyrolytic carbon coating of 5–20 microns thickness and an outer pyrolytic carbon coating of 50–150 microns thickness a gap approximately 15 microns in width is produced. The formation of this relatively large gap is also attributable to the sintering shrinkage and reduction in porosity which occurs on formation of the lower density uranium dicarbide from the uranium monocarbide by reaction with the initial coating of pyrolytic carbon.

Taking this value of 15 microns as an average, the voidage produced would be approximately one fifth of the volume of fissile material. The voidage corresponding to the range of thickness of 5 to 20 microns would thus be about one tenth of one third of the volume of fissile material.

Experimental details of coating conditions for the initial and outer coating techniques described above are is shown in the following table:

[Spheroid diameter 422–500 microns. Density 80–90% of theoretical]

| Case | Argon flow, litres/ min. | CH⁴ flow, litres/ min. | Initial Coat | | Outer Coat | | Condition of spheroid after coating |
| --- | --- | --- | --- | --- | --- | --- | --- |
| | | | Temp., °C. | Time, hours | Temp., °C. | Time, hours | |
| 1) | 4.7 | 0.32 | 1,200 | 9 | | | Outer 10 microns of spheriod converted to $UC_2$. |
| 2) | 4.7 | 0.32 | 1,300 | 4 | | | Very little $UC_2$. |
| 3) | 5.4 | 0.32 | 1,300 | 3 | 1,500 | 4.75 | $UC_2/UC$ needles, $U_2C_3$. UC at spheroid centre. |
| 4) | 5.4 | 0.32 | 1,300 | 2 | 1,500 | 9.25 | Completely $UC_2$ with some UC needles. |
| 5) | 4.7 | 0.65 | 1,400 | 1 | 1,650 | 2.8 | Do. |
| 6) | 4.7 | 0.65 | 1,400 | 1 | 1,750 | 2.0 | Do. |
| 7) | 4.7 | 0.65 | 1,400 | 1 | 1,750 | 1.5 | Do. |

Cases (1) and (2) of the above table correspond to application of the initial coat of pyrolytic carbon at a deposition temperature between 1200° C. and 1400° C. and before application of the outer coating of pyrolitic carbon. It can be seen that very little reaction to form uranium dicarbide, occurs during the application of the initial coat.

In cases (3), (4), (5) and (6), after application of the initial pyrolytic carbon coating at a deposition temperature between 1200° C. and 1400° C., the outer pyrolytic carbon coating was applied at a temperature in the range 1500° C. to 1800° C. In these cases reaction of the initial pyrolytic carbon coating with the uranium monocarbide spheroids to form uranium dicarbide resulted in the production of a gap of approximately 15 microns between the spheroids and the outer pyrolytic carbon coating.

It will be appreciated that temperature of deposition of the outer coating of pyrolytic carbon, deposition time, any "soaking" time (i.e. whilst the spheroids are held fluidised at temperature without any coating gas being fed to the fluidised bed) and diameter and density of the original uranium monocarbide spheroids, are parameters the varying of which will affect the extent of reaction of the initial coating of pyrolytic carbon with the uranium monocarbide spheroids.

In general it may be taken that, depending on the temperature of deposition of the outer coating of pyrolytic carbon a minimum time is required to achieve sufficient reaction to produce the gap between the outer pyrolytic coating and the spheroids. This may be achieved by choosing conditions of operation (i.e. bed size, rate of supply of methane to the bed) such that more than the minimum time for reaction is required to coat the spheroids with an outer coating of required thickness. Alternatively if the coating conditions employed are such that the required thickness of outer pyrolytic carbon coating is achieved before the minimum time required for reaction is reached the spheroids are held "soaking" at temperature for the rest of the time required for reaction without feeding further coating gas to the fluidised bed.

Pyrolytic coated uranium carbide spheroids produced by the method of the invention are found to have fractional failures on nitric acid leeching of fewer than 1 in $10^5$ particles. The low failure fraction on acid leeching is related to the reaction of the original uranium monocarbide spheroids with the initial pyrolytic carbon coating to form uranium dicarbide and the consequent formation of the gap between the spheroids and the outer pyrolytic carbon coating. For example from the above table it can be seen that the minimum times at 1500° C., 1650° C. and 1750° C. are 4¾, 3 and 1½ hours respectively. The presence of the gap between the spheroids and the outer pyrolytic carbon coating permits cooling from the coating temperature without inducing radial cracks into the coating due to the larger thermal contraction of the coating compared with the thermal contraction of the uranium carbide spheroids. Additionally the discontinuity of the gap provides some barrier to uranium diffusion and presumably to fission product diffusion, in use of the coated spheroids in a nuclear reactor fuel element. The method of the invention possesses a further subsidiary advantage when applied to the production of pyrolytic carbon coated uranium carbide spheroids employing methane as the coating medium.

For an economic process it is necessary to achieve a reasonably high coating rate. In general increased coating rate is associated with increased bed temperature. Deposition of pyrolytic carbon onto uranium monocarbide spheroids using methane as the coating medium cannot be directly achieved at temperatures above 1450° C. Above 1450° C. preferential pyrolytic carbon whiskers grow at selected sites on the surface of the uranium monocarbide spheroids. In the early stages of development of the whiskers the spheroids become irregularly coated with small randomly spaced nodules of pyrolytic carbon. If deposition of pyrolytic carbon is continued some of the nodules grow into large whiskers causing build up of partially coated aggregates of the spheroids and finally complete defluidisation of the bed of spheroids in the fluidised bed occurs. Deposition at starting temperature above 1700° C. also causes the fluidised bed of spheroids to defluidise as the carbide spheroids tend to sinter together. Both these effects are avoided by use of the method of the invention. After application of the thin initial layer of pyrolytic carbon at 1200° C. to 1400° C. uniform deposition of the outer pyrolytic carbon coating is achieved at temperatures up to 1800° C.

The method of the invention is also applicable to the production of uranium carbide spheroids coated with a dense layer of silicon carbide. Uranium monocarbide spheroids produced by the method disclosed in our copending British patent application No. 9,538/63 cognate with divisional 12,368/63 are coated in a fluidised bed with an initial layer of pyrolytic carbon 5–20 microns in thickness. Deposition of the initial pyrolytic carbon coating is carried out at a deposition temperature in the range 1200° C. to 1400° C. so that, as shown by cases (1) and (2) of the above table, no reaction occurs between the initial pyrolytic carbon coating and the uranium monocarbide spheroids. A thin layer of silicon carbide is now applied to the spheroids at the same deposition temperature at which the initial pyrolytic carbon coating was applied so that reaction of the pyrolytic carbon coating with the spheroids is again avoided. An outer coating of silicon carbide is applied to the spheroids at a deposition temperature in the range 1500° C. to 1600° C. During deposition of the outer coating of silicon carbide, reaction occurs between the uranium monocarbide spheroids and the initial coating of pyrolytic carbon so that the uranium monocarbide spheroids are converted to uranium dicarbide and a gap is formed between the spheroids and the outer coating of silicon carbide. In this case also it must be ensured that the conditions of operation of the coating process are such that the time of deposition of the outer silicon carbide coating is greater than the minimum required for reaction between the uranium monocarbide spheroids and the initial coating of pyrolytic carbon. Alternatively if deposition of a required thickness of the outer silicon carbide coating is achieved in less than the minimum time required for reaction between the uranium monocarbide spheroids and the initial coating of pyrolytic carbon then the coated spheroids must be allowed to soak at temperature until the minimum time for reaction has been achieved. Deposition temperatures for the outer silicon carbide coating of greater than 1600° C. cannot be used because this results in porous coatings being produced.

Where the silicon carbide coating is applied by the pyrolysis of methyltrichlorosilane in the presence of hydrogen in a fluidised bed of the uranium monocarbide/carbon coated spheroids, the initial or final coatings of silicon carbide may be applied in one operation involving raising the bed temperature from initially for example 1200–1300° C. to for example 1550° C. at an appropriate time during the coating process.

The method of the invention as applied to the production of silicon carbide coated uranium carbide particles is additionally advantageous in that application of the thin coating of pyrolytic carbon serves to protect the kernel of uranium monocarbide against reaction with hydrochloric acid generated when depositing silicon carbide by pyrolysis of methyltrichlorosilane.

A final additional advantage of the method in general lies in the fact that the production of coated uranium dicarbide spheroids of greater than 80% theoretical density is enabled. It has been found that although spheroids of uranium monocarbide of 85–90% theoretical density can be produced by the method disclosed in our copending British patent application No. 9,538/63 cognate with divisional No. 12,368/63, spheroids of uranium dicarbide when produced by the said method can only be obtained having densities of 50–70% of theoretical density. The method of the invention starting with uranium monocarbide spheroids of 85–90% theoretical density results in the final production of a coated uranium dicarbide spheroid having a corresponding density of 85–90% theoretical density and above.

We claim:
1. A method of producing high integrity spheroids of uranium carbide having an outer coating of a substantially impermeable refractory material comprising the steps of applying an initial coating of pyrolytic carbon, 5–20 microns in thickness, on spheroids of uranium monocarbide at a deposition temperature in the range 1200° C. to 1400° C. such that reaction between the applied coating of pyrolytic carbon and the uranium monocarbide spheroids does not take place by a substantial amount, followed by application of an outer coating on the pyrolytic carbon coated uranium monocarbide spheroids of a substantially impermeable refractory material of the group consisting of pyrolytic carbon and silicon carbide said outer coating being applied at a temperature in the range 1500° C.–1800° C. such that reaction takes place between the initial coating of pyrolytic carbon and the uranium monocarbide spheroids to form uranium dicarbide so that voidage, in the form of a gap, is produced between the spheroids and the outer coating of refractory material.

2. A method for producing high integrity spheroids of uranium carbide having an outer coating of substantially impermeable refractory material as claimed in claim 1 wherein the outer coating is of silicon carbide which is applied in two stages, a first coating of silicon carbide being applied to the pyrolytic carbon coated uranium monocarbide spheroids at a temperature in the range 1200° C. to 1400° C. followed by a final coating of silicon carbide which is applied at a temperature in the range 1500° C. to 1600° C.

3. A method according to claim 1 wherein the voidage produced is from one tenth to one third of the volume of the contained spheroids.

4. A method for producing high integrity spheroids of uranium carbide having an outer coating of substantially impermeable refractory material as claimed in claim 3 wherein the outer coating is of silicon carbide which is applied in two stages, a first coating of silicon carbide being applied to the pyrolytic carbon coated uranium monocarbide spheroids at a temperature in the range 1200° C. to 1400° C. followed by a final coating of silicon carbide which is applied at a temperature in the range 1500° C. to 1600° C.

References Cited by the Examiner

UNITED STATES PATENTS

| | | | |
|---|---|---|---|
| 3,079,316 | 2/1963 | Johnson | 176—91 X |
| 3,135,665 | 6/1964 | Koutz et al. | 176—91 X |
| 3,151,037 | 9/1964 | Johnson et al. | 176—91 X |
| 3,166,614 | 1/1965 | Taylor | 176—91 X |

OTHER REFERENCES

Reactor Core Materials, "Coated Particles," Vol. 4, No. 2, May 1961, page 59.

AEC Document, BMI-1628, April 1963, pages 1–7.

BENJAMIN R. PADGETT, *Primary Examiner.*

L. DEWAYNE RUTLEDGE, *Examiner.*

M. J. SCOLNICK, *Assistant Examiner.*